United States Patent
Shimizu et al.

(10) Patent No.: US 10,717,403 B2
(45) Date of Patent: Jul. 21, 2020

(54) CURTAIN AIRBAG

(71) Applicant: AUTOLIV DEVELOPMENT AB, Vargarda (SE)

(72) Inventors: Takayuki Shimizu, Yokohama (JP); Yuto Kobayashi, Yokohama (JP); Mitsuo Nogami, Yokohama (JP); Hiroyoshi Shimono, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 148 days.

(21) Appl. No.: 15/566,124

(22) PCT Filed: Mar. 22, 2016

(86) PCT No.: PCT/JP2016/059073
§ 371 (c)(1),
(2) Date: Oct. 12, 2017

(87) PCT Pub. No.: WO2016/167087
PCT Pub. Date: Oct. 20, 2016

(65) Prior Publication Data
US 2018/0111579 A1    Apr. 26, 2018

(30) Foreign Application Priority Data

Apr. 13, 2015  (JP) ................................. 2015-081709
Apr. 20, 2015  (JP) ................................. 2015-085538

(51) Int. Cl.
*B60R 21/201* (2011.01)
*B60R 21/232* (2011.01)
*B60R 21/213* (2011.01)

(52) U.S. Cl.
CPC .......... *B60R 21/201* (2013.01); *B60R 21/213* (2013.01); *B60R 21/232* (2013.01)

(58) Field of Classification Search
CPC .... B60R 21/213; B60R 21/232; B60R 21/201
See application file for complete search history.

(56) References Cited

U.S. PATENT DOCUMENTS 6,722,693 B2 *  4/2004  Ikeda ................... B60R 21/201
                                              280/730.2
7,083,188 B2 *  8/2006  Henderson ............ B60R 21/201
                                              280/728.2
(Continued)

FOREIGN PATENT DOCUMENTS

DE    102007060282 A1 *  6/2009  ............ B60R 21/20
DE    102016225906 A1 *  6/2018  ................ C09J 7/38
(Continued)

OTHER PUBLICATIONS

International Search Report of PCT/JP2016/059073 dated Jun. 7, 2016.

*Primary Examiner* — Nicole T Verley
(74) *Attorney, Agent, or Firm* — Dickinson Wright PLLC

(57) ABSTRACT

A curtain airbag device that allows easy recognition and correction of twisting of an airbag during attaching. The curtain airbag device can be stored in a compact manner during transportation. The curtain airbag device including an airbag that is disposed along a roof side rail of a vehicle interior, and that can deploy so as to cover a window portion on a side face of the vehicle interior, the curtain airbag device further including a cover that covers the airbag, at least, in a part of the folded or rolled airbag in the longitudinal direction. The cover is formed of a pliable fabric material of polymer fibers, and maintains the shape of the rolled-up airbag through mutual fusion of at least a part of the polymer fibers. A high stiffness portion harder than other portions and formed during the fusion of the cover is provided in the cover extending in the longitudinal direction of the cover.

29 Claims, 12 Drawing Sheets

(56) References Cited

U.S. PATENT DOCUMENTS

| | | | |
|---|---|---|---|
| 7,163,231 B2* | 1/2007 | Kumagai | B60R 21/201 280/728.3 |
| 7,407,182 B2* | 8/2008 | Aoki | B60R 21/201 280/728.1 |
| 7,731,225 B2* | 6/2010 | Yoshida | B60R 21/201 280/730.2 |
| 7,845,674 B2* | 12/2010 | Berntsson | B60R 21/237 280/730.2 |
| 8,091,918 B2* | 1/2012 | Mitchell | B60R 21/201 280/728.2 |
| 8,480,118 B2* | 7/2013 | Kjell | B60R 21/201 280/728.2 |
| 9,539,974 B2* | 1/2017 | Fukuda | B60R 21/213 |
| 9,539,976 B2* | 1/2017 | Jinnai | B60R 21/23138 |
| 9,580,036 B2* | 2/2017 | Choi | B60R 21/213 |
| 9,604,592 B2* | 3/2017 | Desai | B60R 21/213 |
| 9,616,840 B2* | 4/2017 | Arellano | B60R 21/237 |
| 10,066,325 B2* | 9/2018 | Finn | B60R 21/235 |
| 10,384,636 B2* | 8/2019 | Shimizu | B60R 21/2165 |
| 2003/0017285 A1* | 1/2003 | Cantrell | B29C 53/42 428/35.1 |
| 2013/0087999 A1* | 4/2013 | Konishi | B60R 21/201 280/743.1 |
| 2013/0295301 A1* | 11/2013 | Schmitt | B60R 21/232 428/12 |
| 2018/0050653 A1* | 2/2018 | Shimizu | B60R 21/2338 |
| 2018/0208146 A1* | 7/2018 | Azuma | B60R 21/232 |

FOREIGN PATENT DOCUMENTS

| | | | | |
|---|---|---|---|---|
| JP | 2002-249012 A | | 9/2002 | |
| JP | 2003-170798 A | | 6/2003 | |
| JP | 2003170798 A | * | 6/2003 | |
| JP | 2003-306118 A | | 10/2003 | |
| JP | 2006-123674 A | | 5/2006 | |
| JP | 4019928 B2 | * | 12/2007 | |
| JP | 2010-126078 A | | 6/2010 | |
| JP | 5401288 B2 | * | 1/2014 | |
| WO | WO-2011001986 A1 | * | 1/2011 | ........ B60R 21/201 |
| WO | WO-2013146076 A1 | * | 10/2013 | |
| WO | WO-2017122435 A1 | * | 7/2017 | ........ B60R 21/213 |
| WO | WO-2018228831 A1 | * | 12/2018 | ........ B60R 21/207 |

* cited by examiner (A)

(B)

(C)

(D)

(E)

VARIATIONS OF
SLITS (222, 232a, 232b)

THIRD EXAMPLE (1)

FIFTH EXAMPLE (A)

(B)

(C)

SIXTH EXAMPLE (A)

(B)

(C)

(D)

CURTAIN AIRBAG

CROSS-REFERENCE TO RELATED APPLICATIONS

This application is a 35 U.S.C. § 371 national phase application of International PCT Application No. PCT/JP2016/059073, filed Mar. 22, 2016, which claims the benefit of priority under 35 U.S.C. § 119 to Japanese Patent Application No. JP 2015-085538, filed Apr. 20, 2015, and Japanese Patent Application No. JP 2015-081709, filed Apr. 13, 2015, the contents of which are incorporated herein by reference in their entirety.

FIELD OF THE INVENTION

The present invention relates to a curtain airbag device that is installed in a vehicle, and more particularly to a curtain airbag device provided with an airbag (cushion) having features providing favorable packaging.

BACKGROUND

It is well known that vehicles have come in recent years to be provided with one or a plurality of inflatable airbags, with a view to protecting occupants, and in some cases also pedestrians, during a vehicle accident. Airbags are ordinarily formed of a flexible fabric, but some other flexible sheet material, such as plastic materials, are used in some cases. Airbags come in various forms, for instance so-called driver airbags that protect the driver by inflating from the vicinity of the center of the steering wheel of an automobile, curtain airbags that protect an occupant during a side impact, or during a rollover or overturn accident, by deploying downward on the inward side of an automobile window, and also side airbags that deploy between an occupant and a side panel of the vehicle interior, so as to protect the occupant during a side impact. The present invention is optimal mainly for curtain airbags, but can also be used in airbags of other types without any particular limitations.

The useable space available for accommodating airbag devices is ordinarily limited, and is often designed to be very small. There are various conceivable reasons for this, for instance aesthetic considerations, and considerations pertaining to the comfort and convenience of the occupants. Accordingly, airbags that are packaged by compression and that take up only a small space in a rolled and/or folded-up state when not deployed are well known.

For instance, structures have been proposed that are provided with a hard plastic cover around an airbag, in order to maintain the packaged state of the compressed airbag and to facilitate attaching of a unit to an automobile, in a simple and reliable manner. However, this significantly increases the cost and weight of an airbag unit, and also the volume of the packaged airbag, and accordingly it is difficult to produce an airbag unit of sufficiently small size. Moreover, a large space is also required during transport, which translates into higher transport costs, due to the fact that the airbag is covered by the hard cover.

Elongately compressed curtain airbags are prone to twisting, and are difficult to position with respect to vehicle attaching portions. Moreover, it has been difficult to grasp the twisted state that arises also when the airbag twists during attaching to the vehicle. The deployment behavior of the airbag during operation could be affected were the airbag hypothetically attached in a twisted state.

SUMMARY OF THE INVENTION

An object of the present invention, arrived at in the light of the above circumstances, is to provide a curtain airbag device that allows preventing attaching of a twisted airbag, and that allows easily grasping and correcting airbag twist, even if the airbag were attached while twisted.

A further object of the present invention is to provide a curtain airbag device that can be stored in a compact manner during transport.

In order to solve the above problem, the present invention is a curtain airbag device provided with an airbag that is disposed along a roof side rail of a vehicle interior, and that can deploy so as to cover a window portion on a side face of the vehicle interior, the curtain airbag device being further provided with a cover that covers the airbag, at least, in a part of the folded or rolled airbag in the longitudinal direction. The cover is formed of a pliable fabric material having a plurality of polymer fibers, and is configured to maintain the shape of the airbag through mutual fusion of at least a part of the polymer fibers. A high stiffness portion harder than other portions and formed during the fusion of the cover is provided in the cover, the high stiffness portion extending in the longitudinal direction of the cover.

Herein a mark, which allows a twist state to be recognized, can be used as the high stiffness portion. The mark may be configured by providing a recess or a projection by partial deformation of the cover, and the recess or projection may be prescribed to be a line-like groove or rib. The cover can be divided into a plurality thereof, with marks being disposed in the vicinity of respective end sections. Further, a base fabric extension portion that extends from the airbag can be provided on the upper edge of the airbag. Attaching means for attaching the airbag to the vehicle is connected to the base fabric extension portion, and at least a part of the base fabric extension portion is covered by the cover. The base fabric extension portion can be provided in the vicinity of the high stiffness portion.

Another aspect of present invention can be used in a method for producing a curtain airbag device provided with an airbag that is disposed along a roof side rail of a vehicle interior, and that can deploy so as to cover a window portion on a side face of the vehicle interior. The above production method includes the steps of forming the airbag in a folded or roll shape; preparing a cover formed of a pliable fabric material having a plurality of polymer fibers, such that at least a part of the polymer fibers are to fuse together; arranging the cover so as to cover the airbag at least partially in the longitudinal direction of the airbag; and reducing the diameter of a cross-section of the airbag while maintaining the shape of the airbag, as a result of a pressing step of applying pressure to the cover under heating. Forming in the pressing step is performed so that a high stiffness portion harder than other portions and being formed during the fusion of the cover is provided in the cover, the high stiffness portion extending in the longitudinal direction of the cover.

The present invention as described above allows correcting the attitude of an elongate airbag on the basis of a mark that is formed on a cover, and allows improving workability at the time of attaching to a vehicle, while preventing attaching in a twisted state. The mark is formed by modifying a part of the cover, and is harder than other portions. An airbag with cover having a configuration in which a mark is provided in the longitudinal direction of the airbag does not twist as readily as an airbag with cover having no mark provided thereon. Herein not only can the airbag unit be made compact by the use of a cover of a fabric material, but also the airbag unit can be stored in a yet more compact manner by application of pressure to the cover in a heated state. Further, by installing the cover in a divided manner, it becomes possible to bend the roll-like airbag at portions not covered by the cover, and also to reduce the storage space during transport, and to facilitate handling.

A base fabric extension portion that extends from the airbag can be provided on the upper edge of the airbag, and attaching means for attaching the airbag to the vehicle can be connected to the base fabric extension portion. At least a part of the base fabric extension portion is covered by the cover. The efficiency of the assembly operation of the packaged airbag device can be increased as a result. Further, a package structure can be achieved that allows preventing or suppressing damage to the airbag caused by a attaching fitting such as bolts.

Preferably, the diameter of the cross-section of the airbag at the portion covered by the cover is reduced by compression. The bag base fabric extension portion may be provided continuously integrated with the base fabric of the airbag, or as a separate body.

THE DETAILED DESCRIPTION

Figure 1:
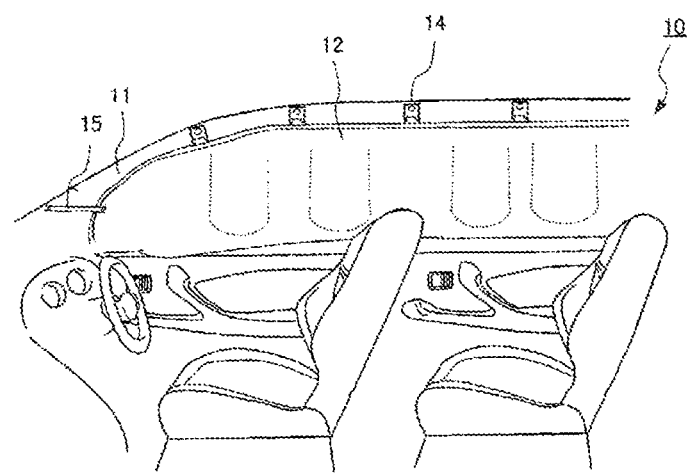
FIG. 1 is a cross-sectional diagram of a cabin portion of an automobile provided with a curtain airbag device according to the present invention, depicting a deployed state.

FIG. 1 is a cross-sectional diagram of a cabin portion of an automobile provided with a curtain airbag device 10 according to the present invention, depicting a deployed state. As illustrated in FIG. 1, an airbag 12 is fixed by bolting, using a plurality of attaching tabs 14, to an inner panel covered with head lining, at the top of a window glass on the cabin side.

The reference symbol 11 denotes an A pillar. A strap 15 that connects the A pillar 11 and the front edge of the airbag 12 is also provided. The strap 15 can be formed as a band of uniform width, out of the same material (fabric) as that of the airbag 12. The strap 15 itself can be formed of a material (for instance, a synthetic resin) different from that of the airbag.

Figure 2:
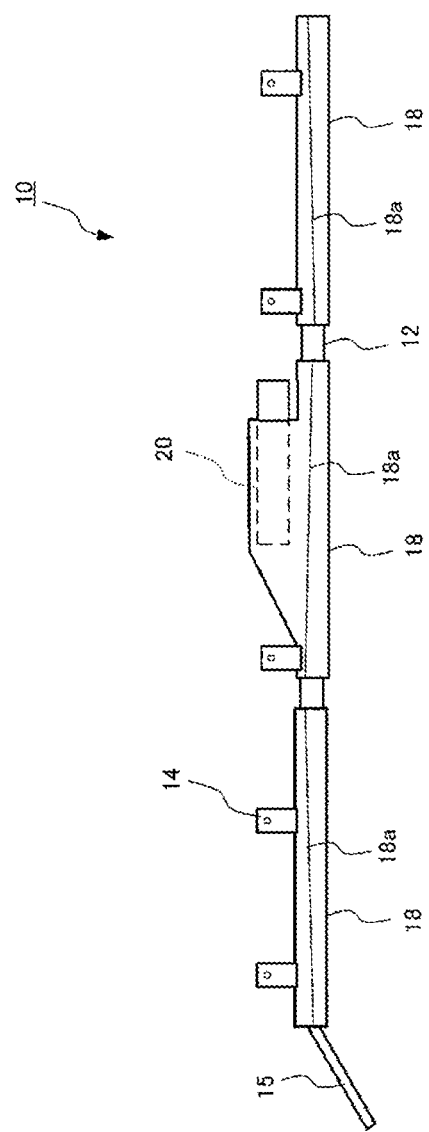
FIG. 2 is a front-view diagram illustrating the structure of a curtain airbag device according to a first example of the present invention.

FIG. 2 is a front-view diagram illustrating the structure of the curtain airbag device 10 according to a first example of the present invention. The curtain airbag device 10 according to the present example is provided with a cover member 18 that covers the airbag 12, at least partly in the longitudinal direction of the folded or rolled airbag 12. The cover member 18 is formed of a pliable fabric material having a plurality of polymer fibers, and is configured to maintain the shape of the airbag 12 by virtue of the fact that at least some of the polymer fibers are fused together, and are compressed, by application of pressure while under heating. Tabs 14 extending from the airbag 12 are provided on the upper edge of the airbag 12. The diameter of the cross-section of the airbag 12 at the portion covered by the cover member 18 is reduced by compression.

The airbag 12 can be formed by superimposing two substantially identical sheets of a flexible material such as a woven fabric, and by connecting the sheets to each other at aligned edges of the sheets, by a peripheral seam, to define a large inner inflatable portion between the sheets that receives inflating gas from an inflator 20 such as a gas generator. The airbag 12 can also be obtained by overlaying two layers resulting from folding in half of one sheet of a flexible material, the layers being then connected to each other by a peripheral seam. Alternatively, the airbag 12 can be woven in accordance with a so-called "One Piece Weaving (OPW)" technique, wherein warp and weft yarns that form an inflating region and a non-inflating region are interwoven at a selected portion, to form a woven structure of a plurality of sheets, and to form a peripheral connection portion in which the plurality of sheets are connected to an inflation chamber (chamber).

The fabric for producing the airbag 12 is preferably a plastic fabric, for instance a fabric formed by weaving of warp and weft yarns of polyamide fibers. The fabric may be coated with a thermoplastic material. As illustrated in FIG. 2, the airbag 12 is formed so as to have an opening for insertion of the inflator 20 into the airbag 12. For instance, a cylindrical inflator extends passing through the opening, such that most of the length of the inflator is present inside the airbag 12.

In order to package the airbag 12 so as to be installable in a vehicle, the airbag 12 is firstly rolled and/or folded, to a rod-like shape, from the bottom to the top. A package may be formed by folding the airbag 12, or by forming two or more rolls in the airbag 12, or by combining known techniques of airbag rolling and folding. In a rolling technique the airbag 12 may be rolled around a mandrel (not shown) to yield a package that is then pulled out in the axial direction.

The cover member 18 may be wound so as to enclose the entire circumferential direction of the rod-like airbag 12. A part of the cover member 18 can be held by basting or the like against the base fabric of the bag, so as to preclude unraveling of the airbag 12 and of the cover member 18. A tear-seam (not shown) can be provided beforehand, for instance in the form of perforations, in the cover member 18. This tear-seam is configured to break during inflation of the airbag 12, in such a manner that the airbag 12 jumps easily out of the cover 18 when deploying at the time of a collision.

The material of the cover member 18 can take the form of a nonwoven fabric material having a plurality of polymer fibers, being a pliable fabric material. A felt-like fabric can be used as the nonwoven fabric. For instance, the fabric is a polyester felt produced in accordance with a known needle method that involves tangling and fixing polyester fibers to one another by needling. The polyester fibers can be provided in the form of polyethylene terephthalate (PET), with the felt material being made of 100% PET. The fibers making up the felt material are tangled with each other in a random or quasi-random fashion. The felt can include fibers of two different configurations.

Mono-component fibers 48 that make up the felt of the cover member 18 can all be formed of a PET homopolymer, but bi-component composite fibers 48 having a core 50 and a sheath 52 that surrounds the core can also be used. The core 50 and the sheath 52 of the bi-component composite fibers 48 are configured so as to have different characteristics. In particular, the melting points of the foregoing are different, or alternatively the sheath 52 has an arbitrarily lower melting point (for instance, in the range of 120° C. to 150° C.) than that of the core 50. The bi-component composite fibers 48 can all be formed of PET, but it is possible to form the core 50 out of a PET homopolymer, and to form the sheath 52 out of a PET copolymer (coPET). Although the melting point of the sheath 52 is lower than the melting point of the core 50 as a result of such a combination of PET and coPET, the entirety of the fibers 48 can be reliably formed of PET. Both the core 50 of the bi-component composite fibers 48 and the mono-component fibers are formed of a PET homopolymer, and accordingly the foregoing have mutually identical melting points, with the mono-component fibers having a higher melting point than that of the sheath 52 of the bi-component composite fibers. The bi-component composite fibers 48 are evenly distributed throughout the mono-component fibers 48 in the felt material. The bi-component composite fibers 48 can take up 30% to 60% of the totality of fibers 48 in the felt material, the balance being made up of just mono-component fibers. The materials that are used in the mono-component fibers 48 and bi-component composite fibers 48 may be configured so as to include partially the above fibers, so long as the fibers can fuse together effectively.

The rolled and/or folded airbag 12 having been formed in the shape of a rod is wrapped with the felt cover member 18, to form thereby an intermediate package. Thereafter, portions to be compressed and surrounded by the cover member 18 are pressed using a press machine (not shown), to be thus compressed to the desired three-dimensional shape and size. The press machine operates while heating the intermediate package, for instance at a temperature higher than the melting point of the sheath 52 of the bi-component composite fibers 48 but lower than the melting points of the core 50 of the bi-component composite fibers 48 and of the mono-component fibers. Heat and pressure need not essentially be applied to the package at the same time. A three-dimensional shape can be obtained easily through press compression of the intermediate package, by virtue of the flexibility of the airbag 12 and the flexibility of the initial cover member 18.

In a case where the airbag 12 is formed of a plastic fabric, the fabric of the airbag 12 deforms plastically, when compressed, as a result of simultaneous application of pressure and heat to the intermediate package. The rod-like airbag 12 inside the intermediate package retains the compressed shape even when cooled thereafter. Even if the airbag 12 is not formed of a plastically deformable material, however, simultaneous application of heat and pressure to the intermediate package causes in any event the felt material of the cover member 18 to plastically deform in that, when compressed, the fibers 48 of the felt material become compressed together, and the felt material becomes accordingly thinner (for instance, 0.55 mm). More specifically, the sheath 52 of the bi-component composite fibers 48 melts when heated at a temperature higher than the melting point of the sheath. Therefore, the sheaths 52 fuse together at all the positions of the distributed fibers 48 in the cover member 18. The cover member 18 is heated at a temperature lower than the melting points of the core 50 of the bi-component composite fibers 48 and of the entire structure of the mono-component fibers; accordingly, the cores and the mono-component fibers remain as a solid phase without fusing together, and it is only the material in the sheaths 52 that fuses.

The cover member 18 in the present example is divided into three members, such that the roll-like airbag 12 is exposed through the resulting gaps. An airbag unit can thus be bent at portions where such airbag 12 is exposed.

A line 18a as a mark for enabling recognition of twist is provided on the surface of the cover member 18. To illustrate an example, in FIG. 2, the airbag 12 is depicted in a slightly twisted state, and accordingly the line 18a is slightly oblique.

Figure 3:
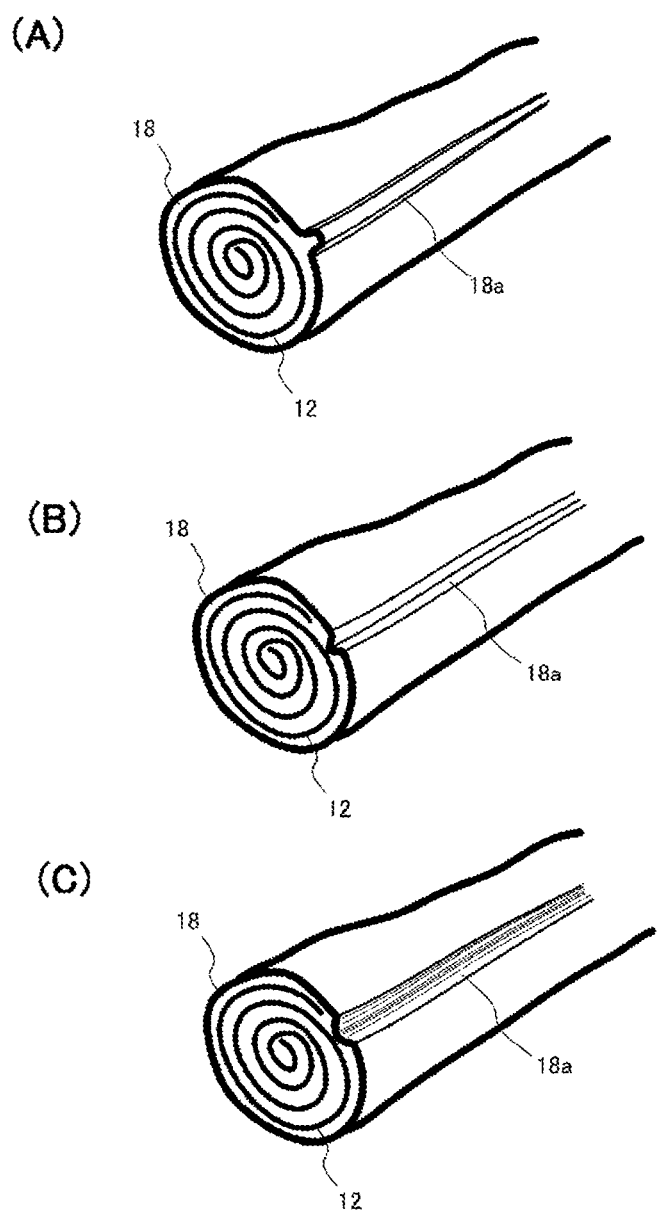
FIGS. 3(A), 3(B) and 3(C) are partial perspective-view diagrams illustrating the structure of a main part of the curtain airbag device according to the first example of the present invention, depicting cross-sections of an airbag and of a cover.

FIGS. 3(A), 3(B) and 3(C) are partial perspective-view diagrams illustrating the structure of the main part of the curtain airbag device 10 according to the first example of the present invention, depicting cross-sections of the airbag 12 and of the cover 18. In the example illustrated in FIG. 3(A), the mark line 18a is formed extending parallelly in the longitudinal direction of the airbag. A part of the cover member 18 forms a rib that protrudes convexly from the surface of the cover. In the illustrated example the inside of the rib appears hollow, but the entirety or a part of the rib may be solid.

In the example illustrated in FIG. 3(B), the mark line 18a is formed extending in the longitudinal direction of the airbag, parallel to the longitudinal axis of the rolled-up airbag, the cross-section of the line 18a being herein shaped in the form of a triangular groove (V-shaped groove) sunk from the surface of the cover. In the example illustrated in FIG. 3(C), the mark line 18a is formed extending in the longitudinal direction of the rolled-up airbag, the cross-section of the line 18a being herein shaped in the form of a semicircular groove (U-shaped groove) sunk from the surface of the cover.

Preferably, these mark lines 18a are provided so as to reach the end sections of the cover member 18. When the marks reach the end sections, it becomes easy to confirm prevention of twist matching of the marks (i.e. it becomes possible to recognize the twisted state). Although the line 18a formed as a groove is found to be a portion of higher stiffness and density than other portions of the cover, the bottom portion of the groove (curved surface portion of a U-shaped bottom, or tip portion of a V-shaped portion) is formed to be thin, and accordingly the line 18a is likely to be the origin of a tearing part during inflation and deployment of the airbag. The groove can constitute an origin of a tearing part even just by being formed at an intermediate portion of the cover member. In terms of ease of tearing, a configuration is preferred wherein the groove, as the origin of the tearing location, is provided up to the end sections of the cover member, as described above.

Forming of the mark lines 18a is accomplished in a heating compression step of the cover member 18. Specifically, a line-like groove or projection is formed on the inner face of press die (not shown), and a mark line 18a such as those of FIGS. 3(A) to 3(C) is formed by pressing in the die. A material is disposed beforehand at a portion constituting the mark line, before heating compression, in such a manner that, in the heating compression step of the entire cover member by the press die the material draws near the portion constituting the mark line, as a result of which a rib thicker than other portions can be formed as the mark line. Alternatively, a groove that yields the mark line can be formed by using a die having a protruding portion that constitutes the mark line, such that the density of the mark line is higher than that of other portions as a result of heating compression. The rib and groove form a high stiffness portion along line 18a harder than other portions, and thus the cover member itself does not twist readily.

Figure 4:
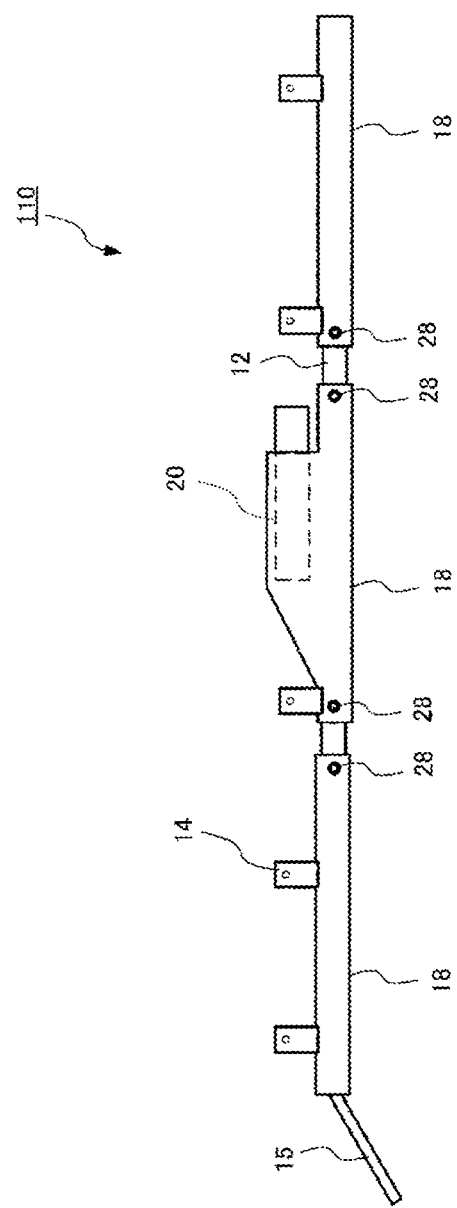
FIG. 4 is a front-view diagram illustrating the structure of a curtain airbag device according to a second example of the present invention.

FIG. 4 is a front-view diagram illustrating the structure of a curtain airbag device 110 according to a second example of the present invention. In this example, marks 28 are projections or recesses formed in the vicinity of the end sections of a cover member 18 that is disposed in a divided manner. In such a configuration, twisting of the airbag 12 can be easily corrected by matching of the positions of adjacent marks 28. The marks 28 in the present example are formed to be circular in a front view, but may be formed as short straight lines (not shown) running in the longitudinal direction of the airbag 12. As a result, absence of twisting can be confirmed just by matching of the longitudinal directions of the straight lines of the marks, between adjacent cover ends, to the effect that the directions are substantially co-linear with each other. The degree of awareness of the twisted state (ability to detect a twist state) is thus improved.

The curtain airbag is tightly wound lengthwise, and the width thereof is small; accordingly, a concern arises in that the curtain airbag is prone to being attached in a twisted state to a head liner of an automobile, which may adversely affect the inflation characteristic of the airbag. By wrapping of the curtain airbag 12 at least partially in the cover member 18, the airbag unit becomes less likely to twist after installation in a vehicle. This facilitates positioning at portions of attaching to the vehicle using brackets, bolts and the like. Moreover, a twisted state itself can be corrected thanks to the fact that the cover member 18 has formed thereon the marks 18a or 28, as a reference for detecting twist.

Third to sixth examples of the present invention will be explained next. All these third to sixth examples can be used in conjunction with the first and second examples described above, but the figures and explanation of the marks 18a and 28 used in the first and second examples, and the explanation of the airbag 12 itself, will be omitted for convenience of explanation.

Figure 5:
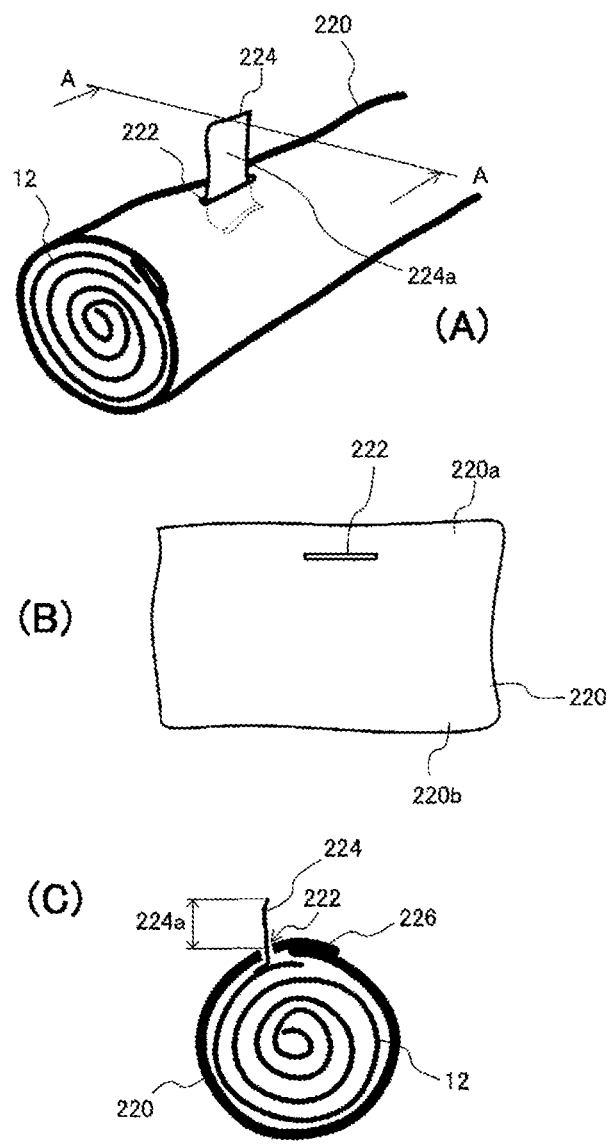
FIG. 5(A) is a partial perspective-view diagram illustrating the structure of a main part of a curtain airbag device according to a third example of the present invention, depicting a state with the airbag rolled and stored (press-compressed)
FIG. 5(B) is a schematic plan-view diagram illustrating the structure of a cover member used in the airbag device according to the third example of the present invention.
FIG. 5(C) is a cross-sectional diagram of FIG. 5(A) in direction A-A.

FIG. 5(A) is a partial perspective-view diagram illustrating the structure of a main part of a curtain airbag device according to a third example of the present invention, depicting a state where the airbag 12 is rolled and stored (press-compressed). FIG. 5(B) is a schematic plan-view diagram illustrating the structure of a cover member 220 used in the present example. FIG. 5(C) is a cross-sectional diagram of FIG. 5(A) in direction A-A. The curtain airbag device 10 according to the present example is provided with a cover member 220 that covers the airbag 12, at least partly in the longitudinal direction of the folded or rolled airbag 12.

The cover member 220 is formed of a pliable fabric material having a plurality of polymer fibers 48, and pressure is applied, while under heating of the cover member 220, in a state where the end sections 220a and 220b overlap each other. Accordingly, the cover member 220 is configured so as to maintain the shape of the airbag 12, while the overlapping end section 220a and 220b form a high stiffness portion 226 thanks to the fact that at least some of the polymer fibers 48 are fused together, and are compressed. A base fabric extension portion 224 extending from the airbag 12 is provided on the upper edge of the airbag 12. Attaching means for attaching the airbag 12 to the vehicle is connected to the base fabric extension portion 224. A part of the base fabric extension portion 224 is covered by the cover member 220. The base fabric extension portion 224 in this case is configured in the form of a so-called tab. The high stiffness portion 226 is provided so as to extend in the longitudinal direction of the cover member 220.

The diameter of the cross-section of the airbag 12 at the portion covered by the cover member 220 is reduced by compression. The bag base fabric extension portion 224 can be formed continuously integrated with the base fabric of the airbag 12, or as a separate body. The bag base fabric extension portion 224 has an outer portion 224a extending outside the cover member 222, through a slit 222 provided in the cover member 220. The base fabric extension portion 224 is for instance shaped in the form of a band of the same material as that of the airbag 12, and can be fixed to the upper edge of the airbag 12 by stitching of one end of the base fabric extension portion 224.

The slit 222 and the base fabric extension portion 224 that runs through the slit 222 are preferably disposed in the vicinity of the above-described high stiffness portion 226. This affords various benefits such as stabilization of the attitude of the base fabric extension portion 224, by virtue of the fact that the periphery thereof has high stiffness. Although not shown in the figures, the base fabric extension portion 224 may be disposed in the vicinity of the marks 18a, 28 described above, to the same effect.

Figure 6:
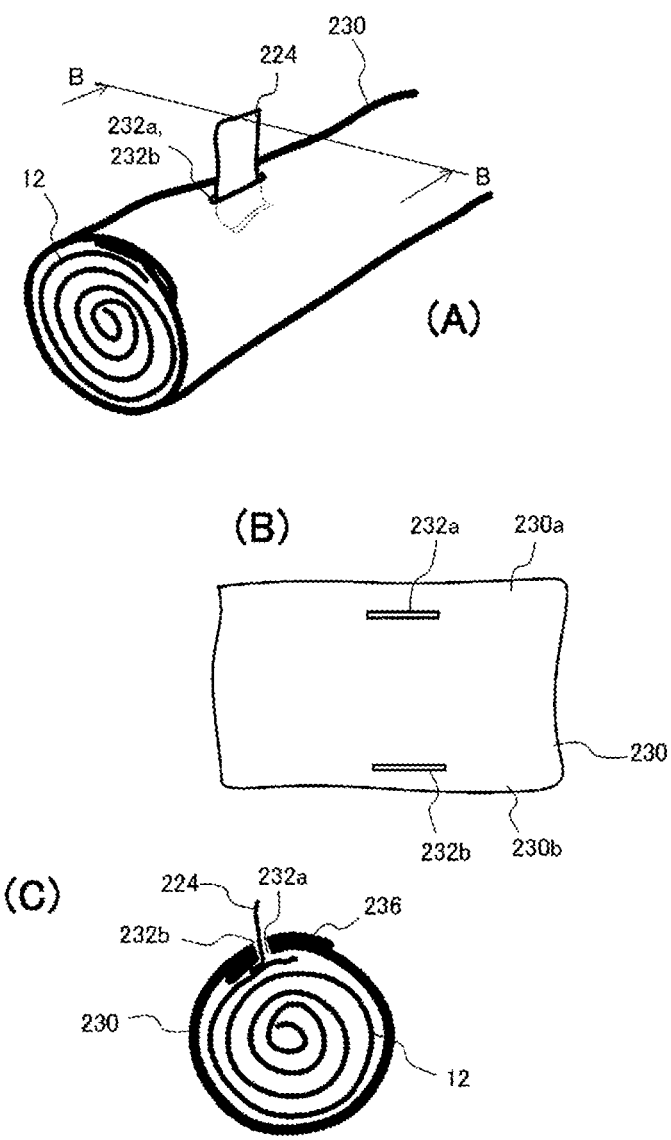
FIG. 6(A) is a partial perspective-view diagram illustrating the structure of a main part of a curtain airbag device according to a variation of the third example of the present invention, depicting a state with the airbag rolled and stored (press-compressed)
FIG. 6(B) is a schematic plan-view diagram illustrating the structure of a cover member used in the airbag device according to the above variation.
FIG. 6(C) is a cross-sectional diagram of FIG. 6(A) in direction B-B.

FIG. 6(A) is a partial perspective-view diagram illustrating the structure of a main part of a curtain airbag device according to a variation of the third example of the present invention, depicting a state where the airbag 12 is rolled and stored (press-compressed). FIG. 6(B) is a schematic plan-view diagram illustrating the structure of a cover member 230 used in the airbag device according to the present variation. FIG. 6(C) is a cross-sectional diagram of FIG. 6(A) in direction B-B. The variation illustrated in FIGS. 6(A)-6(C) and the third example illustrated in FIGS. 5(A)-5(C) differ as regards the structures of the cover member 220 and of the cover member 230. In the present variation, two slits 232a, 232b are provided in the cover member 230, such that the base fabric extension portion 224 passes through both slits. Specifically, the base fabric extension portion 224 passes initially through one slit 232a, and in that state, the cover member 230 is wrapped around the airbag 12. Thereafter, the base fabric extension portion 224 can be passed once more through the other slit 232b, while the end sections 230a and 230b of the cover member 230 are will on each other. The superimposed portions form a high stiffness portion 236 during fusion of the polymer fibers 48.

The structure (i.e., materials, production method or the like) of the airbag 12 is identical to those of the first and second examples described above.

In order to package the airbag 12 so as to be installable in a vehicle, the airbag 12 is firstly rolled and/or folded to a roll-like shape, adopting a form such as those illustrated in FIG. 5(A) and FIG. 6(A). A package may be formed by folding the airbag 12, or by forming two or more rolls in the airbag 12, or by combining known techniques of airbag rolling and folding. In a rolling technique, the airbag 12 may be rolled around a mandrel (not shown) to yield a package that is then pulled out in the axial direction.

The cover member 220, 230 surrounds the roll-like airbag 12. For instance, the cover member 220, 230 is wound over the entire circumferential direction of the airbag 12, in such a manner that both end regions (220a, 220b, 230a, 230b) in the winding circumferential direction overlap each other. A part of the cover member 220, 230 can be held by basting or the like against the base fabric of the bag, so as to preclude unraveling of the airbag 12 and of the cover member 220, 230. A tear-seam (not shown) can be provided beforehand, for instance in the form of perforations, in the cover member 220, 230. This tear-seam is configured to break during inflation of the airbag 12, in such a manner that the airbag 12 jumps easily out of the cover 220, 230 when deploying at the time of a collision.

The material of the cover member 220, 230 can take the form of a nonwoven fabric material having a plurality of polymer fibers 48, being a pliable fabric material. A felt-like fabric can be used as the nonwoven fabric. For instance, the fabric is a polyester felt produced in accordance with a known needle method that involves tangling and fixing polyester fibers 48 to one another by needling. The polyester fibers 48 can be provided in the form of polyethylene terephthalate (PET), with the felt material being made of 100% PET. The fibers 48 making up the felt material are tangled with each other in a random or quasi-random fashion. The felt can include fibers 48 of two different configurations.

Mono-component fibers 48 that make up the felt of the cover member 220, 230 can all be formed of a PET homopolymer, but bi-component composite fibers 48 having a core 50 and a sheath 52 that surrounds the core can also be used. The core 50 and the sheath 52 of the bi-component composite fibers 48 are configured so as to have different characteristics. In particular, the melting points of the foregoing are different, or alternatively the sheath 52 has an arbitrarily lower melting point (for instance, in the range of 120° C. to 150° C.) than that of the core. The bi-component composite fibers 48 can all be formed of PET, but it is possible to form the core out of a PET homopolymer, and to form the sheath 52 out of a PET copolymer (coPET). Although the melting point of the sheath 52 is lower than the melting point of the core 50 as a result of such a combination of PET and coPET, the entirety of the fibers 48 can be reliably formed of PET. Both the core 50 of the bi-component composite fibers 48 and the mono-component fibers 48 are formed of a PET homopolymer, and accordingly the foregoing have mutually identical melting points, with the mono-component fibers 48 having a higher melting point than that of the sheath 52 of the bi-component composite fibers. The bi-component composite fibers 48 are evenly distributed throughout the mono-component fibers 48 in the felt material. The bi-component composite fibers 48 can take up 30% to 60% of the totality of fibers in the felt material, the balance being made up of just mono-component fibers.

The airbag 12 having been shaped in the form of a roll-like and/or folded shape is wrapped with a felt cover member 220, 230, to form thereby an intermediate package. Thereafter, the sites to be compressed and surrounded by the cover member 220, 230 are pressed using a press machine (not shown), to be thus compressed to the desired three-dimensional shape and size. The press machine operates while heating the intermediate package, for instance at a temperature higher than the melting point of the sheath 52 of the bi-component composite fibers 48 but lower than the melting points of the core 50 of the bi-component composite fibers 48 and of the mono-component fibers 48. Heat and pressure need not essentially be applied to the package at the same time. A three-dimensional shape can be obtained easily by press compression of the intermediate package, by virtue of the flexibility of the airbag 12 and the flexibility of the cover member 220, 230.

In a case where the airbag 12 is formed of a plastic fabric, the fabric of the airbag 12 deforms plastically, when compressed, as a result of simultaneous application of pressure and heat to the intermediate package. The roll-like airbag 12 inside the intermediate package retains the compressed shape even when cooled thereafter. Even if the airbag 12 is not formed of a plastically deformable material, however, simultaneous application of heat and pressure to the intermediate package causes in any event the felt material of the cover member 220, 230 to plastically deform in that, when compressed, the fibers 48 of the felt material become compressed together, and the felt material becomes accordingly thinner (for instance, 0.55 mm). More specifically, the sheath 52 of the bi-component composite fibers 48 melts when heated at a temperature higher than the melting point of the sheath 52. Therefore, the sheaths fuse together at all the positions of the distributed fibers 48 in the cover member 220, 230. The cover member 220, 230 is heated at a temperature lower than the melting points of the core 50 of the bi-component composite fibers 48 and of the entire structure of the mono-component fibers 48; accordingly, the cores 50 and the mono-component fibers remain as a solid phase without fusing together, and it is only the material in the sheaths 52 that fuses.

The curtain airbag is tightly wound lengthwise, with a narrow width, and therefore a concern arises in that the curtain airbag is prone to being attached to a head liner of an automobile in a twisted state, which may adversely affect the inflation characteristic of the airbag. By wrapping of the curtain airbag 12 at least partially in the cover member 220, 230, the airbag unit becomes less likely to twist after installation in the vehicle. A part of the base fabric extension portion 224 is exposed beforehand outside the cover member 220, 230, and accordingly no positional offset of the base fabric extension portion for fixing to the vehicle arises as a result of the pressing process. This facilitates positioning at portions of attaching to the vehicle using brackets, bolts and the like.

An embodiment in which there is used the nonwoven fabric material 220, 230 of felt type of the present invention has been explained in specific terms above, but for instance a woven fabric or the like can also be used, besides nonwoven materials. Specifically, it suffices herein that the fabric has a material composition or has a constituent fiber structure that confers mobility or elastic behavior to the fibers of the fabric.

Figure 7:
FIGS. 7(A)-7(E) are explanatory diagrams illustrating a variation of slits formed in a cover member that is used in the third example of the present invention illustrated in FIGS. 5(A)-5(C) and FIGS. 6(A)-6(C).
Figure 7:
Figure 7:
Figure 7:
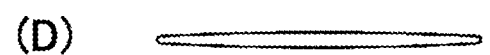
Figure 7:
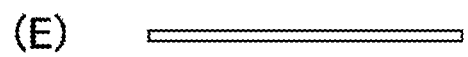

FIGS. 7(A)-7(E) are explanatory diagrams illustrating a variation of the slits 222, 232a, 232b formed in the cover member 220, 230 that is used in the third example of the present invention illustrated in FIGS. 5(A)-5(C) and FIGS. 6(A)-6(C). FIG. 7(A) illustrates a simple cut, FIG. 7(B) illustrates a cut formed having circular cut-outs at both ends, FIG. 7(C) illustrates a cut having certain width and being formed having circular cut-outs at both ends, FIG. 7(D) illustrates an elongate elliptical cut and FIG. 7(E) illustrates a rectangular elongate cut-out. In the present invention, preferably, the shape of the slits is selected for instance in accordance with the material and stiffness of the base fabric extension portion 224.

Figure 8:
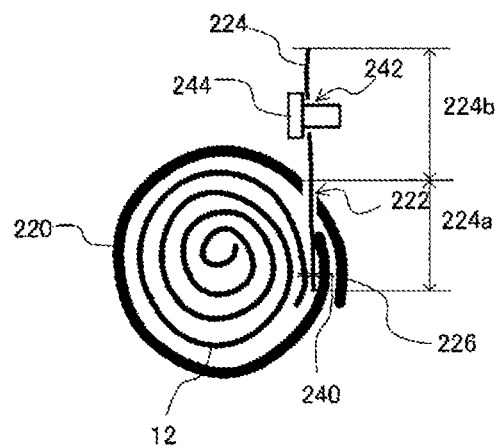
FIG. 8 is a cross-sectional diagram illustrating the structure of a main part of the curtain airbag device according to the third example of the present invention illustrated in FIG. 5, depicting a state with the airbag rolled and stored (press-compressed).

FIG. 8 is a cross-sectional diagram illustrating the structure of a main part of a curtain airbag device according to the third example of the present invention illustrated in FIGS. 5(A)-5(C), depicting a state when the airbag is rolled and stored (press-compressed). The base fabric extension portion 224 can be divided into regions in the form of a lower-side base 224a disposed inside the cover member 220, and attaching means 224b that extends from the base 224a towards the exterior of the cover member 220. The regions 224a, 224b are formed integrally with each other. The attaching means 224b has formed therein an opening 242 that is run through by a fixing member 244 such as a clip or a bolt. The lower end of the base 224a of the base fabric extension portion 224 is connected, by way of stitching 240, to an outermost end section of the rolled airbag 12 and to an inner end section of the high stiffness portion 226 of the cover member 220. In the present example, there is used the base fabric extension portion 224 having one end covered by the cover member 220, and accordingly a part (224b) of the base fabric extension portion 224 is exposed also when pressed from the exterior of the cover member 220. Therefore, the attaching position can be easily grasped during the operation of attaching on the vehicle, and workability is significantly enhanced. As further benefits, the structure is simple and production costs can be kept down. This affords various benefits such as stabilization of the attitude of the base fabric extension portion 224 by virtue of the fact that vicinity of the base 224a of the base fabric extension portion is the high stiffness portion 226.

Figure 9:
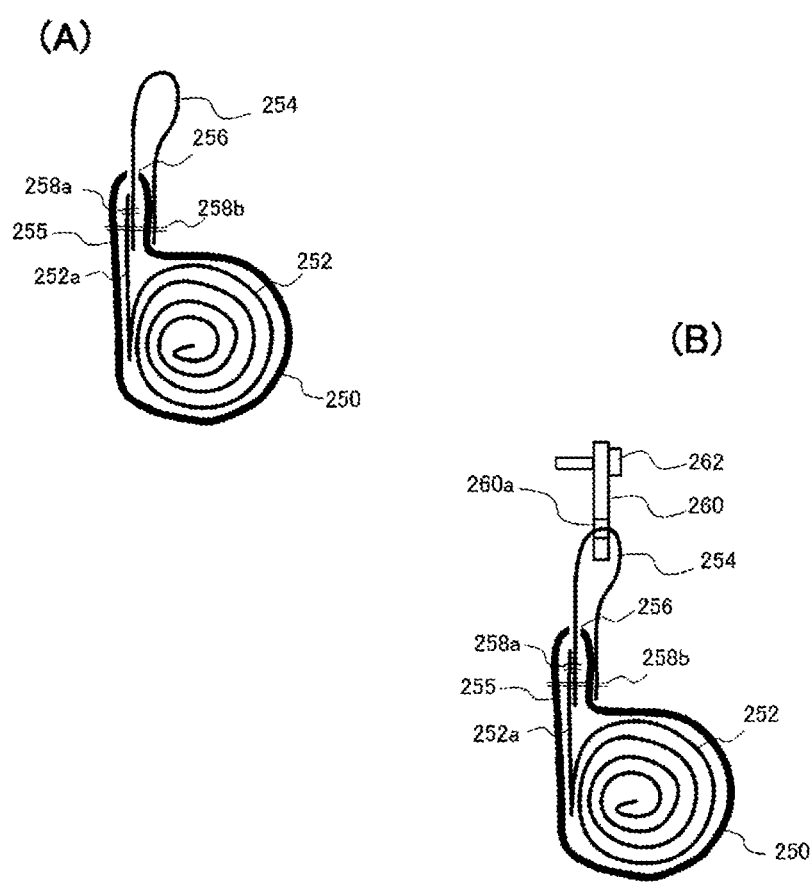
FIG. 9(A) is a cross-sectional diagram illustrating the structure of a main part of a curtain airbag device according to a fourth example of the present invention, depicting a state with the airbag rolled and stored (press-compressed)
FIG. 9(B) is a cross-sectional diagram illustrating an actual example of use of the fourth example of the present invention, depicting a state with the airbag rolled and stored (press-compressed) as in FIG. 9(A).

FIG. 9(A) is a cross-sectional diagram illustrating the structure of a main part of a curtain airbag device according to a fourth example of the present invention, depicting a state with the airbag rolled and stored (press-compressed), corresponding to the sites of FIG. 5(C) and FIG. 6(C). The explanation below will focus on portions different from those of the third example described above; herein basic features such as the material of the airbag and the material of the cover member are identical to those of the third example, and accordingly a recurrent explanation thereof will be omitted herein.

In the present example, an outer end section (upper end section) of an airbag 252 wound in the form of a roll is folded back, to form a base fabric extension portion 252a. A part of the cover member 250 corresponding to the base fabric extension portion 252a is extended upward in the form of a bag at the tip of which an opening 256 is formed. One end of a band-like attaching member 254 is inserted in the opening 256, and is connected to the airbag extension 252a by stitching 258a. One end of the attaching member 254, the two side faces of the cover member 250 joined together over two folds, the airbag extension 252a and the other end of the attaching member 254 are all connected by stitching 258b at a position offset from below the stitching 258a. The attaching member 254 adopts as a result a loop-like shape. A part of the airbag 12 in the present example functions as the base fabric extension portion 252a. Both sides of the base fabric extension portion 252a are surrounded by the cover member. On account of separation by the base fabric extension portion 252a, cover member sections do not fuse together except at the end sections. However, respective portions become provided at high density and close to each other, during compression of the polymer fibers; in consequence, the portion around the base fabric extension portion 252a of the cover member constitutes a portion 255 exhibiting higher stiffness than those of other portions, in the cover member viewed as a whole.

FIG. 9(B) is a cross-sectional diagram illustrating an actual example of use of the fourth example of the present invention, depicting a state with the airbag rolled and stored (press-compressed) as in FIG. 9(A). In this example of use, the top end of the loop-like attaching member 254 is passed through an opening 260a of a bracket 260. The airbag unit is fixed to the vehicle by fixing means 262 such as a clip or a bolt, via the bracket 260. In the present example, the respective portions on both sides of the base fabric extension portion 252a are provided at a high density and close to each other, during compression of the polymer fibers; in consequence, the portion around the base fabric extension portion 252a of the cover member constitutes a portion 255 exhibiting higher stiffness than those of other portions, in the cover member viewed as a whole. The loop-like attaching member 254 is provided in the vicinity of the high stiffness portion 255, and as a result the attitude of the attaching member 254 is stabilized, which is beneficial for instance in terms of improving workability of attaching to the vehicle.

Figure 10:
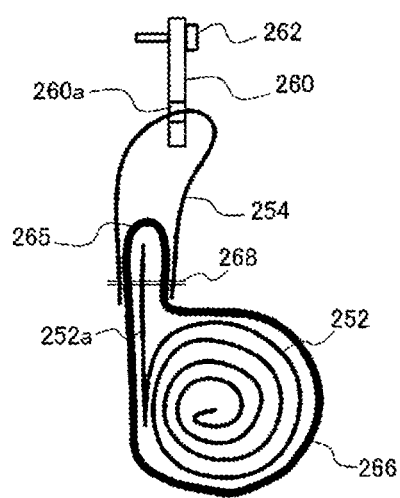
FIG. 10(A) is a cross-sectional diagram illustrating the structure of a main part of a curtain airbag device according to a fifth example of the present invention, depicting a state with the airbag rolled and stored (press-compressed)
FIGS. 10(B) and 10(C) are a cross-sectional diagrams illustrating the structure of a curtain airbag according to a variation of the fifth example of the present invention, depicting a state with the airbag rolled and stored (press-compressed) as in FIG. 10(A).
Figure 10:
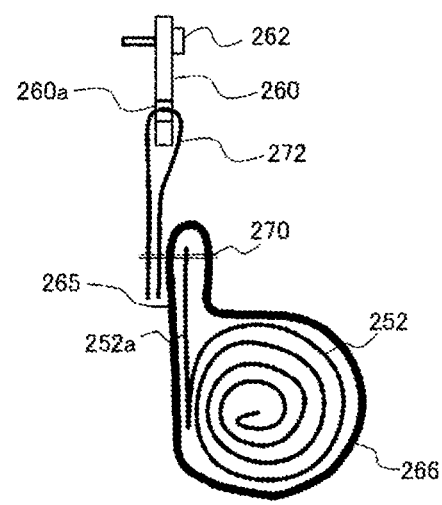
Figure 10:
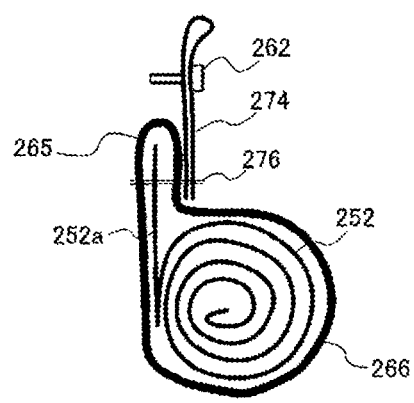

FIG. 10(A) is a cross-sectional diagram illustrating the structure of a main part of a curtain airbag device according to a fifth example of the present invention, depicting a state at a time where the airbag is rolled and stored (press-compressed). The structure illustrated in FIG. 10(A) has many portions shared with the structure illustrated in FIG. 9(B), and accordingly the explanation will focus on differences. Unlike the structure of FIG. 9(B), the attaching member 254 is not inserted into a cover member 266, but is positioned completely on the exterior. A protruding part of the cover member 266 at both end sections of the loop-like attaching member 254 is pinched and fixed, by way of stitching 268, together with the base fabric extension portion 252a.

FIG. 10(B) is a cross-sectional diagram illustrating the structure of a curtain airbag according to a variation of the fifth example of the present invention, depicting a state with the airbag rolled and stored (press-compressed) as in FIG. 10(A). The difference between this variation and the example illustrated in FIG. 10(A) is the connection position of the loop-like attaching member 272. In the present example both ends of the attaching member 272 are connected while superimposed on each other, by way of stitching 270, on the vehicle exterior side (vehicle side) of the portion where the cover member 266 protrudes.

FIG. 10(C) is a cross-sectional diagram illustrating the structure of a curtain airbag according to a variation of the fifth example of the present invention, depicting a state with the airbag rolled and stored (press-compressed) as in FIG. 10(A). The difference between this variation and the example illustrated in FIG. 10(B) is the connection position of the loop-like attaching member 274, and the method for fixing to the vehicle. In the present example both ends of the attaching member 274 are connected while superimposed on each other, by way of stitching 276, on the cabin side of the portion where the cover member 266 protrudes. In the present example, no bracket is used, and the airbag unit is fixed to the vehicle using fixing means 262 such as a clip or a bolt, via a band-like attaching member.

In all FIGS. 10(A) to 10(C), the respective portions on both sides of the base fabric extension portion 252a are provided at a high density and close to each other, during compression of the polymer fibers 48; as a result, the portion around the base fabric extension portion 252a of the cover member constitutes a portion 265 exhibiting higher stiffness than those of other portions, in the cover member viewed as a whole. Each loop-like attaching member 254, 272, 274 is provided in the vicinity of the high stiffness portion 265, and as a result the attitude of the attaching member 254, 272, 274 is stabilized, which is beneficial for instance in terms of improving workability of attaching to the vehicle.

Figure 11:
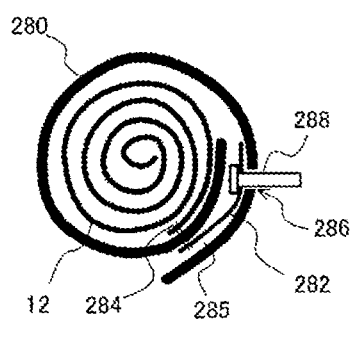
FIG. 11(A) is a cross-sectional diagram illustrating the structure of a main part of a curtain airbag device according to a sixth example of the present invention, depicting a state with the airbag rolled and stored (press-compressed)
FIGS. 11(B), 11(C) and 11(D) are cross-sectional diagrams illustrating the structure of a curtain airbag according to a variation of the sixth example of the present invention, depicting a state with the airbag rolled and stored (press-compressed) as in FIG. 11(A).
Figure 11:
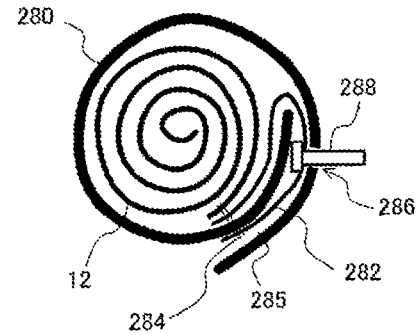
Figure 11:
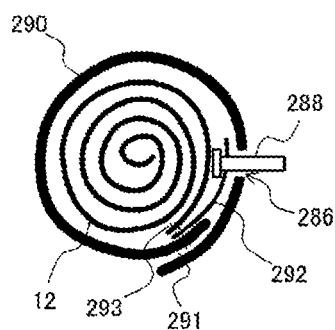
Figure 11:
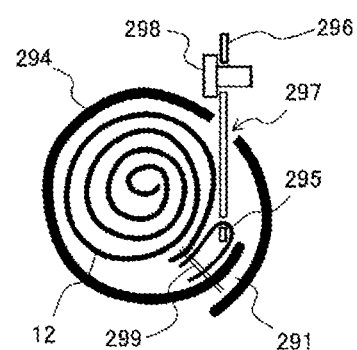
Figure 12:
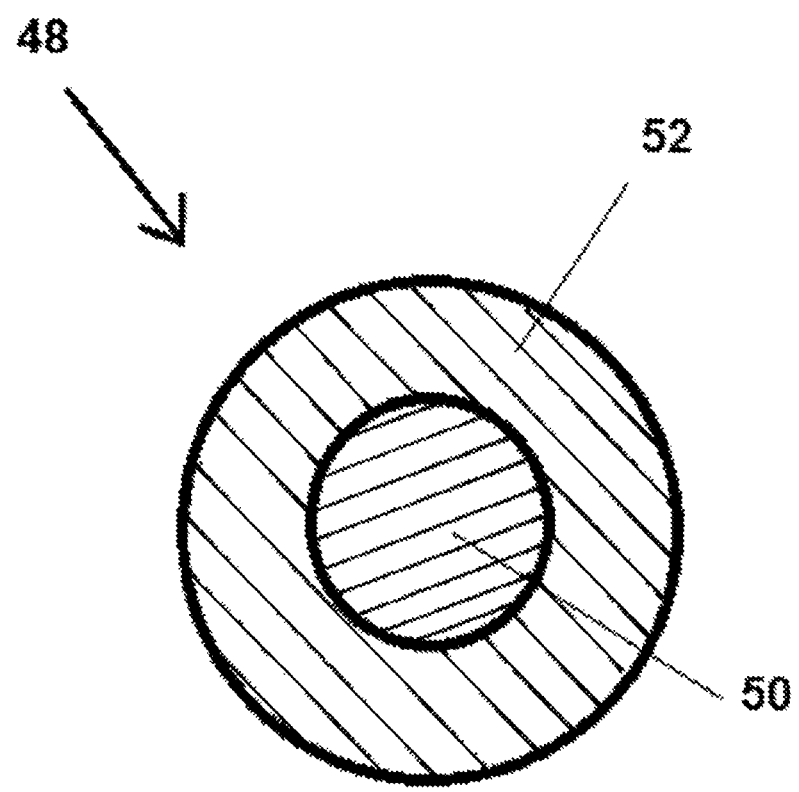
FIG. 12 is a cross-sectional view through a fiber for forming the cover of the invention.

FIG. 11(A) is a cross-sectional diagram illustrating the structure of a main part of a curtain airbag device according to a sixth example of the present invention, depicting a state with the airbag rolled and stored (press-compressed). The characterizing features of the present example include: the base fabric extension portion 282 is completely covered by the cover member 280; the base fabric extension portion 282 is connected to the outermost section of the airbag 12, but the end section of the cover member 280 is pinched between the base fabric extension portion 282 and the airbag 12; a base fabric extension portion 282 is pinched between both end sections of the cover member 280, at a portion 285 where the end sections overlap each other; and a part of the fixing member 288 such as a clip or a bolt is covered by the cover member 280. The fixing member 288 is connected to the vehicle by running through an opening 286 that is provided in the cover member 280. The other end of the base fabric extension portion 282 is fixed, by way of stitching 284, to the outermost section of the airbag 12 and the inner end section of the cover member 280.

When fixing in the present example the airbag 12 to the vehicle body by way of a structure such as the above, airbag 12 can be installed by bringing the folded-up airbag close to the fixing position. Accordingly, the curtain airbag can be disposed even in the small space of the roof side rail in the vehicle, between the vehicle body and a garnish. Ordinarily the cover member 280 is interposed between the rolled airbag 12 and a part of a hard (high stiffness) fixing member 288. It becomes as a result possible to reduce damage dealt to the airbag 12 by the fixing member 288 during deployment.

FIG. 11(B) is a cross-sectional diagram illustrating the structure of a curtain airbag according to a variation of the sixth example of the present invention, depicting a state with the airbag rolled and stored (press-compressed) as in FIG. 11(A). The structure in this variation is substantially identical to the structure of FIG. 11(A), but differs from the structure of FIG. 11(A) in that the base fabric extension portion 282 is provided wrapped around an end section of the cover member 280.

FIG. 11(C) is a cross-sectional diagram illustrating the structure of a curtain airbag according to a variation of the sixth example of the present invention, depicting a state with the airbag rolled and stored (press-compressed) as in FIG. 11(A). The main differences between this variation and the structure of FIG. 11(A) are an overlap portion 291 of the end section of a cover member 290, as well as the manner of overlapping and the positional relationship of joints between the base fabric extension portion 292, the airbag 12 and the cover member 290. In the present example, the outermost end section of the airbag 12 and the end section of the base fabric extension portion 292 oppose each other, and also the end section of the base fabric extension portion 292 and the inner end section of the cover member 290 oppose each other, so that as a result the base fabric extension portion 292 is sandwiched between the airbag 12 and the cover member 290. The portion at which these three layers overlap is connected and fixed by way of stitching 293. The opening 286 is formed in the cover member 290, and the airbag unit is fixed to the vehicle by the fixing member 288. The overlap portion 291 of the cover member 290 is small, and hence the airbag 12 can be stored in a yet smaller space.

FIG. 11(D) is a cross-sectional diagram illustrating the structure of a curtain airbag according to a variation of the sixth example of the present invention, depicting a state with the airbag rolled and stored (press-compressed) as in FIG. 11(A). The characterizing features of this variation are: a base fabric extension portion 295 is bent to a U-shape inside a cover member 294; and one end of a connecting bracket 296 is connected to the base fabric extension portion 295, inside the cover member 294. Both end sections of the loop-like base fabric extension portion 295 are connected and fixed, by stitching 299, to the outermost end section of the airbag 12 and the inner end section of the cover member 294, while sandwiched by the foregoing members. A part of the cover member 294 has formed therein an opening 297 through which the bracket 296 passes. The airbag unit is fixed to the vehicle by the fixing member 298, such as a clip or a bolt, via the bracket 296.

In all the examples illustrated in FIGS. 11(A)-11(D), the respective portions on both sides of each base fabric extension portion 282, 292, 295 are provided at a high density and close to each other, during compression of the polymer fibers 48 of the cover member. The base fabric extension portions 282, 292, 295 are in the form of so-called tabs, and are provided partially in the longitudinal direction of the airbag 12. Therefore, the polymer fibers 48 of the cover member fuse together over most of each cover member 280, 290, 294, without sandwiching of each base fabric extension portion 282, 292, 295. As a result the portion around the base fabric extension portion 282 and the portion of overlap of both end sections of the cover member constitute a portion 285, 291 exhibiting higher stiffness than those of other portions, in the cover member viewed as a whole. A pliable material such as that of the tabs does not protrude out of the cover member, in the state of a unit after tucking of the fixing member 288 and a part of the bracket 296 inside the cover member followed by press compression. The fixing member 288 and the bracket 296 are provided in the vicinity of the high stiffness portion 285, 291; as a result, the attitudes of the base fabric extension portion 282, 292, 295 and of the fixing member 288, 298 and so forth associated with the foregoing are stabilized, which is beneficial for instance in terms of improving the attaching workability of the airbag unit.

The characterizing features set forth as exemplary embodiments, or as a means for implementing disclosed functions, or as a method or process for achieving the described results, in the disclosure of the description above or the claims and appended drawings below, may be adopted individually or arbitrarily combined with other characterizing features, as appropriate, to realize the present invention in various forms.

For instance, the explanation above refers specifically to embodiments in which a nonwoven fabric material 18 of felt type is used as a pliable fabric material, but for instance a woven fabric can also be used, besides nonwoven materials. Specifically, it suffices herein that the fabric has a material composition or has a constituent fiber structure that confers mobility or elastic behavior to the fibers of the fabric.

The present invention has been explained in connection with the exemplary embodiments above, but a greater number of equivalent modifications and variations than those disclosed herein should be apparent to a person skilled in the art. Therefore, the above exemplary embodiments of the present invention are deemed to be not limiting but exemplary, and various modifications can be made in the disclosed embodiments without deviating from the spirit or scope of the present invention.

While the above description constitutes the preferred embodiment of the present invention, it will be appreciated that the invention is susceptible to modification, variation and change without departing from the proper scope and fair meaning of the accompanying claims.

The invention claimed is:

1. A curtain airbag device having an airbag that is disposed along a roof side rail of a vehicle interior, and the curtain airbag adapted to deploy so as to cover a window portion on a side face of the vehicle interior,
   the curtain airbag device comprising,
   a cover that covers the airbag, at least in a part of the airbag in a folded or rolled condition in the longitudinal direction, wherein
   the cover is formed of a pliable fabric material having a plurality of polymer fibers, and is configured to maintain the shape of the airbag in the folded or rolled condition through a mutual fusion of at least a part of the polymer fibers;
   the cover has a high stiffness portion of the cover harder than other portions of the cover, and the high stiffness portion is formed during the fusion of the cover, extends in the longitudinal direction of the cover, and is formed by superimposed portions of the cover; and
   the high stiffness portion defines a mark that is formed by providing a recess or a projection by partial deformation of the cover and allows a twisted state of the airbag in the folded or rolled condition to be recognized.

2. The curtain airbag device according to claim 1, further comprising, the cover is provided by being divided at a plurality of parts in the longitudinal direction of the airbag in the folded or rolled condition.

3. The curtain airbag device according to claim 2, further comprising, the mark is formed in the vicinity of an end section of the cover of at least one of the plurality of parts.

4. The curtain airbag device according to claim 1, further comprising, the mark is a line-like groove or a rib formed in the longitudinal direction of the airbag, and on a surface of the cover.

5. The curtain airbag device according to claim 1, further comprising, the mark is formed in the longitudinal direction of the airbag, on a surface of the cover, and constitutes a tearing part during an inflation and deployment of the airbag.

6. The curtain airbag device according to claim 1, further comprising,
   a base fabric extension portion that extends from the airbag is provided on an upper edge of the airbag;
   an attachment for attaching the airbag to the vehicle interior is connected to the base fabric extension portion; and
   at least a part of the base fabric extension portion is covered by the cover.

7. The curtain airbag device according to claim 6, further comprising, the base fabric extension portion is provided in the vicinity of the high stiffness portion.

8. The curtain airbag device according to claim 6, further comprising, the base fabric extension portion is continuously integrated with a base fabric of the airbag.

9. The curtain airbag device according to claim 6, further comprising, the base fabric extension portion is provided separately from a base fabric of the airbag.

10. The curtain airbag device according to claim 6, further comprising, the base fabric extension portion has an outer portion that extends outside the cover through a slit provided in the cover.

11. The curtain airbag device according to claim 10, further comprising, the cover is provided with a plurality of the slits, through which the base fabric extension portion passes a plurality of times.

12. The curtain airbag device according to claim 6, further comprising, the attachment is folded back in a body part direction of the airbag, and is connected by sewing, along with the cover and the base fabric extension portion inside the cover.

13. The curtain airbag device according to claim 6, further comprising, the attachment is connected to the base fabric extension portion.

14. The curtain airbag device according to claim 13, further comprising, the attachment includes a bracket that connects the base fabric extension portion and a fixing member for fixing to the vehicle.

15. The curtain airbag device according to claim 6, further comprising,
   the entirety of the base fabric extension portion is covered by the cover; and
   the attachment is provided on the outside of the cover, and is connected by sewing, along with the cover and the base fabric extension portion inside the cover.

16. The curtain airbag device according to claim 15, further comprising, the attachment is made up of a band-like fabric, and connects, to the band-like fabric, a fixing member for fixing to the vehicle.

17. The curtain airbag device according to claim 15, further comprising,
   the attachment is provided with a band-like fabric member in which a band-like fabric is formed in a loop-like shape, a fixing member for fixing to the vehicle, and a bracket connected between the fixing member and the band-like fabric member, and a loop of the band-like fabric member is connected to a part of the bracket.

18. The curtain airbag device according to claim 6, further comprising, the entirety of the base fabric extension portion is covered by the cover;

the base fabric extension portion is connected to the attachment inside the cover;

a part of the attachment is provided so as to be exposed to the outside of the cover; and the cover and the base fabric extension portion inside the cover are connected by sewing.

19. The curtain airbag device according to claim 18, further comprising, the attachment is made up of a clip or a bolt that can be attached to a vehicle body.

20. The curtain airbag device according to claim 18, further comprising, a part of the cover member is configured to be interposed between the attachment and a body of the airbag.

21. The curtain airbag device according to claim 18, further comprising, inside the cover, the base fabric extension portion is folded back in a direction opposite a direction in which the airbag is folded up or rolled in the folded or rolled condition, and a part of the cover member wound beforehand is provided interposed between the attachment and a body of the airbag.

22. The curtain airbag device according to claim 18, further comprising, the attachment is provided with a fixing member for fixing to the vehicle, and with a bracket for connecting the fixing member and the base fabric extension portion, and a part of the bracket is provided so as to be exposed to the outside of the cover.

23. The curtain airbag device according to claim 1, further comprising, the pliable fabric material is a nonwoven fabric.

24. The curtain airbag device according to claim 1, wherein the plurality of polymer fibers comprises a plurality of bi-component composite fibers with a core and a sheath, such that the shape of the airbag is stabilized through fusion of the sheaths of the bi-component composite fibers to one another.

25. The curtain airbag device according to claim 24, further comprising, the core of the bi-component composite fibers is formed of a polymer material having a first melting point; and the sheath of the bi-component composite fibers is configured by comprising a polymer material having a second melting point lower than the first melting point.

26. The curtain airbag device according to claim 24, further comprising, the plurality of polymer fibers comprise a plurality of mono-component fibers.

27. The curtain airbag device according to claim 25, further comprising, the plurality of polymer fibers comprise a plurality of mono-component fibers; and the mono-component fibers have a melting point higher than the melting point of the sheath of the bi-component composite fibers.

28. The curtain airbag device according to claim 25, further comprising, the core of the bi-component composite fibers is formed of a PET homopolymer, and the sheath is formed of a PET copolymer.

29. The curtain airbag device according to claim 25, further comprising, the mono-component fibers are formed of PET.

\* \* \* \* \*